Patented Oct. 27, 1925.

1,558,688

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

PROCESS OF COMPOUNDING RUBBER.

No Drawing.   Application filed March 10, 1923.   Serial No. 624,275.

*To all whom it may concern:*

Be it known that we, CHAUNCEY C. LOOMIS and HORACE E. STUMP, citizens of the United States, residing, respectively, in Yonkers and Brooklyn, in the counties of Westchester and Kings and State of New York, have invented a new and useful Improvement in Processes of Compounding Rubber, of which the following is a specification.

This invention relates in general to the compounding of rubber. When rubber is compounded commercially it is the custom to add certain fillers, as zinc oxide, lamp black, clay, etc., and also certain pigments to give it color. There is in addition, also of course, incorporated sulphur or other vulcanizing agent. In the past these various materials other than the rubber itself have been kneaded into the plastic unvulcanized body of the rubber material. This operation is expensive and has the further disadvantage that even after long manipulation the added ingredients have not a wholly satisfactory even distribution.

The present invention has for its present object the facilitation of the incorporation of these several ingredients into compound. The invention in this regard contemplates a process which may be produced at very much less expense, minimizing greatly the kneading operation and insuring an even distribution throughout the mass of the introduced materials.

In accordance with the present invention the various materials are incorporated in finely divided state in a dilute solution of latex of rubber, balata, gutta percha, and the like, the solution of the particular latex of course depending upon the rubber material to be compounded. The mixture of latex with the ingredients is then treated to cause coagulation of the latex and thus coagulated, is filtered and dried. This action causes each minute particle of compounding ingredient to be encased in and surrounded by a thin coating of rubber. Thus physically constituted the materials may be added into the compound and a relatively small amount of kneading affects the even distribution throughout the mass.

As an example of the proportion of ingredients we have selected clay. Ninety parts of clay may be mixed or stirred into a thousand parts of water and a sufficient amount of ammoniacal latex to produce 10 parts of dry rubber. Upon experiment it was found that after this mixture was stirred no settling took place even after several hours of standing. This emulsion is then coagulated with a coagulant, as aluminum sulphate, precipitated out and dried. This precipitant has the appearance of clay to the naked eye but has a rubbery feel. Examination under the microscope discloses the circumstance that with a magnification of 440 diameters it was impossible to distinguish the rubber and clay particles and it is believed that the clay particles have been divided to between 1 and 2 microns in size. Exactly the same procedure is or may be followed in preparing the sulphur for compounding and also the pigments used. These various materials may be treated separately or together and are introduced into the rubber body to complete the compounding operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. The process which consists in preparing compounding ingredients for subsequent addition to a body of rubber, which consists in surrounding and encasing the particles of such ingredients in a thin coating of rubber, and then introducing the so-treated ingredients into a main body of rubber material.

2. The process which consists in preparing compounding ingredients for subsequent addition to a plastic unvulcanized body of rubber material, which consists in adding such ingredients, in a finely divided state, to a dilute solution of latex, adding a coagulant to produce coagulation of the latex, and removing the water, thereby to cause the particles of the compounding ingredients to be encased in and surrounded by a thin coating of rubber, and then introducing the so-treated ingredients into the main body of rubber material.

CHAUNCEY C. LOOMIS.
HORACE E. STUMP.